Feb. 23, 1943. D. H. HEXTELL 2,312,036
MOTOR VEHICLE BUMPER
Filed Sept. 18, 1941 2 Sheets-Sheet 2
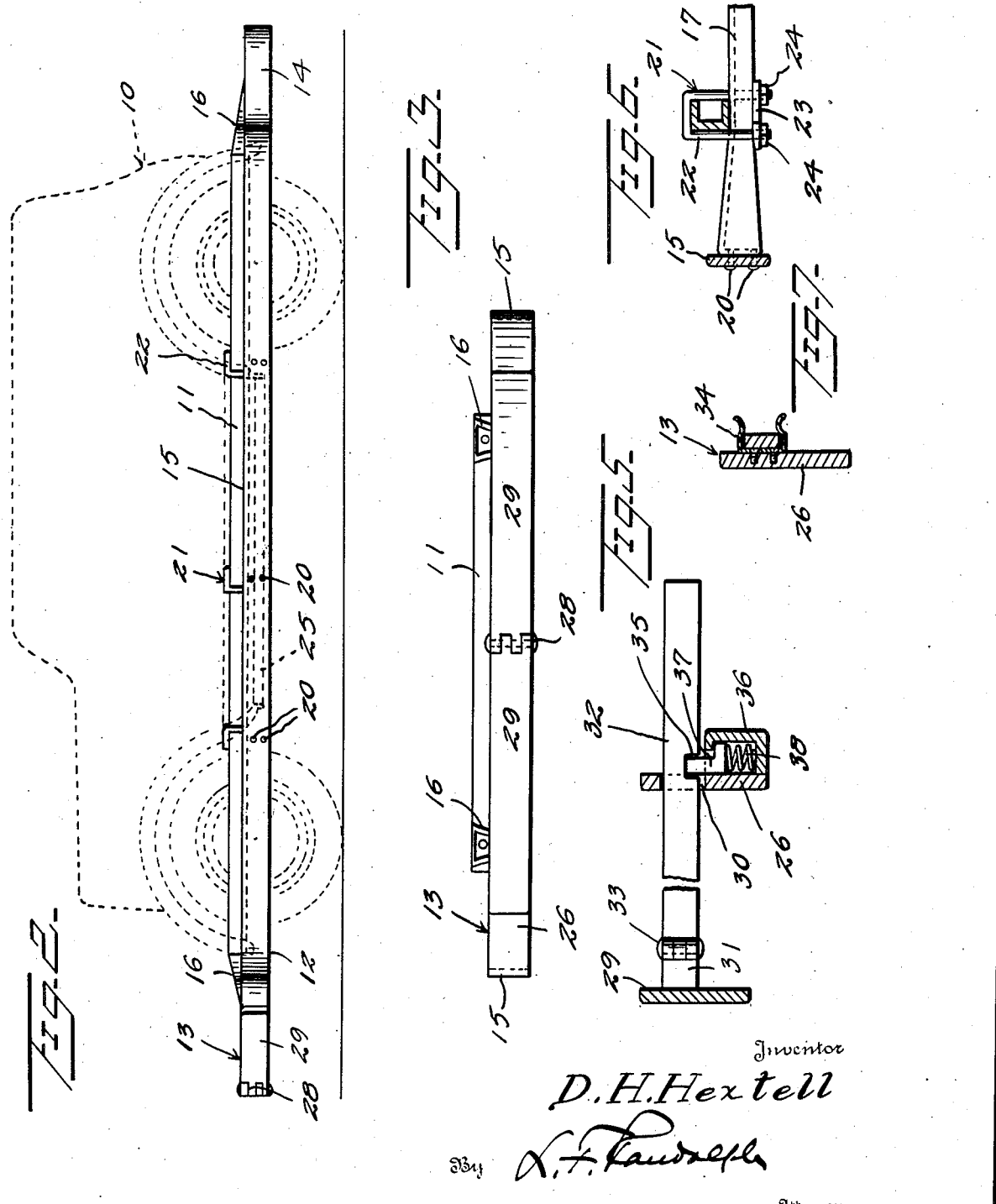

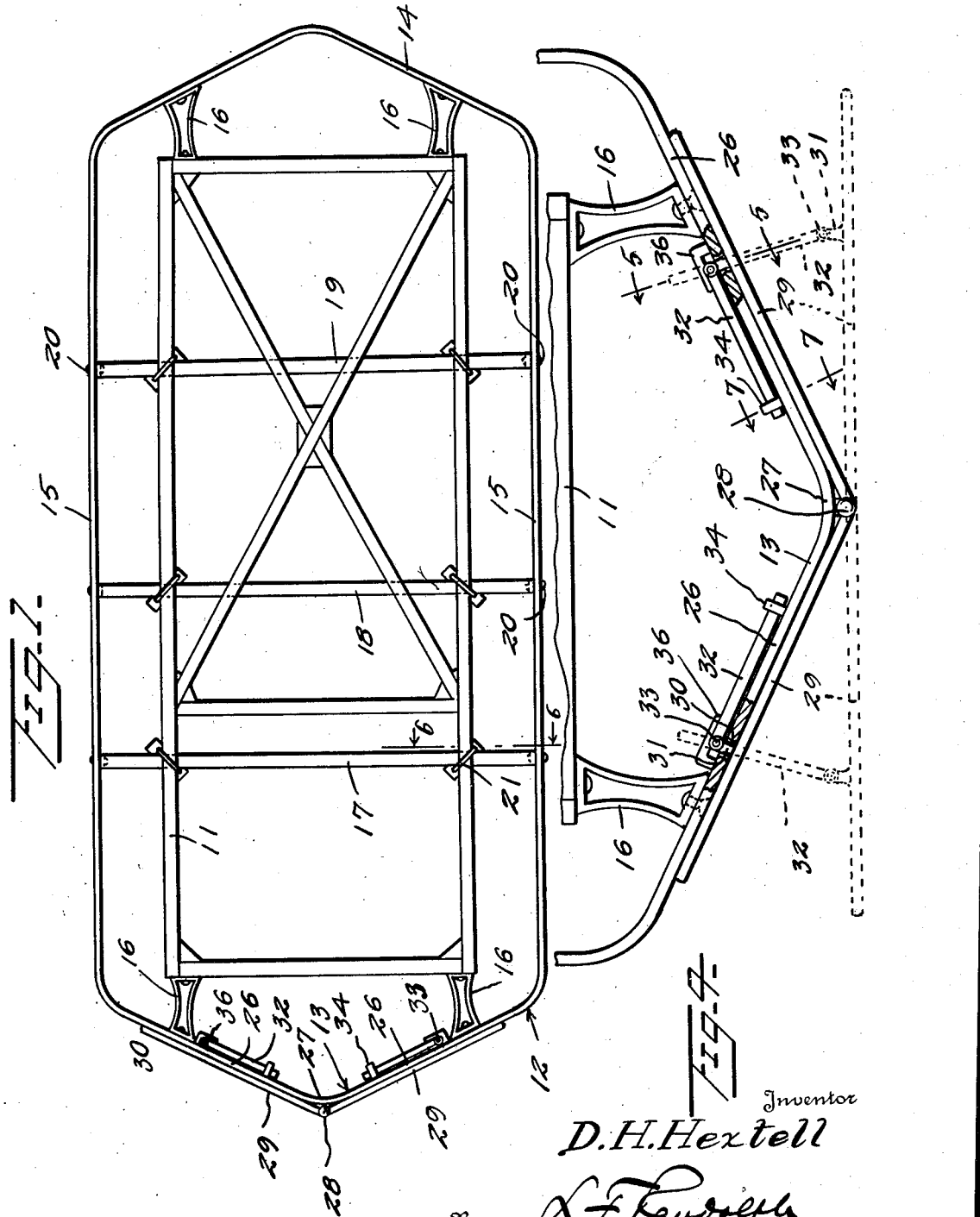

Patented Feb. 23, 1943

2,312,036

UNITED STATES PATENT OFFICE 2,312,036

MOTOR VEHICLE BUMPER

Dale H. Hextell, Grundy County, Ill.

Application September 18, 1941, Serial No. 411,393

2 Claims. (Cl. 293—57)

This invention relates to a novel construction of bumper for motor vehicles, and especially to a bumper which is adapted to extend entirely around a motor vehicle, such as an automobile for protecting not only the ends of the vehicle but also the sides thereof.

Another aim of the invention is to provide an endless bumper member which is adapted to extend entirely around a motor vehicle, and which is equipped with means for bracing the side bumper portions and means for attaching the bracing means to the chassis frame of the vehicle for supporting the bumper thereon.

Still a further aim of the invention is to provide a bumper having outwardly tapered end portions disposed in front and back of the vehicle, and which are arranged so that should two vehicles, equipped with bumpers of the same construction, collide, and with the end portions of the bumpers receiving the impact of the collision, the colliding end portions would be deflected away from one another to direct the two vehicles away from each other so that only a glancing impact would result.

Still another object of the invention is to provide means associated with the tapered end portions which are extensible for forming a substantially flat portion arranged, transversely of the longitudinal axis of the vehicle, so that a vehicle equipped with the bumper could be used for pushing another vehicle or for being pushed.

Other objects and advantages of the invention will hereinafter become more fully apparent from the following description of the drawings, which illustrate a preferred embodiment of the invention, and wherein:

Figure 1 is a plan view showing the improved bumper attached to the chassis frame of a motor vehicle, Figure 2 is a side elevational view of the bumper shown applied relatively to an automobile, which is shown in dotted lines, Figure 3 is a front elevational view of the bumper and chassis frame, Figure 4 is an enlarged top plan view of the same, Figure 5 is an enlarged vertical sectional view through the front portion of the bumper, showing the pusher attachment in an extended position, and taken along a plane indicated by the line 5—5 of Figure 4.

Figure 6 is a transverse vertical sectional view, on an enlarged scale, taken substantially along a plane indicated by the line 6—6 of Figure 1, and Figure 7 is a sectional view taken substantially along the plane of the line 7—7 of Figure 4.

Referring more particularly to the drawings, wherein like reference characters designate like or corresponding parts throughout the different views, 10 designates generally a conventional passenger motor vehicle or automobile, shown in dotted lines in Figure 2, and 11 designates generally the chassis frame thereof, shown in full lines in Figure 2, and best shown in top plan in Figure 1. The bumper, designated generally 12, and comprising the invention, extends entirely around the vehicle 10, and is preferably in the form of an endless member having corresponding end portions forming the front and back bumper portions 13 and 14, respectively, and corresponding, substantially straight side portions 15, forming the side bumper portions. The chassis frame 11 is provided with conventional forwardly and rearwardly projecting bumper supporting brackets 16 to which the bumper portions 13 and 14 are attached for bracing the portions 13 and 14 relatively to the ends of the chassis frame 11. A plurality of transverse bars 17, 18 and 19 are disposed transversely of the chassis frame 11 and bumper 12. The ends of the members 17, 18 and 19 are secured by fastenings 20 to complementary portions of the sides 15. The members 17, 18 and 19 are disposed beneath the side rails of the chassis frame 11 and are detachably connected thereto by fastenings 21 which, as seen in Figure 6, each includes an inverted U-shape yoke member 22 having threaded ends, a plate or bar 23 having openings to engage said ends, and nuts 24 for engaging the threaded ends of the yoke 22, below the bar 23 and which are adjustable for clamping the parts engaged by the fastenings 21, between the bar 23 and the intermediate portion of the yoke shaped member 22. The foremost member 17 has its end portions disposed between the front wheels and the front ends of the running boards 25 of the vehicle 10. The rearmost member 19 has its end portions disposed between the rear wheels and the rear ends of the running boards 25. The thickness of the intermediate member 18 is reduced and said member has its ends disposed below the running boards 25. The members 17, 18 and 19 not only brace the bumper side portions 15 but also act to partially support the bumper 12.

The front and rear bumper portions 13 and 14 each include outwardly converging parts 26 which are connected by an arcuately shaped outwardly bowed center portion 27. The portions 27 are disposed substantially centrally of the vehicle 10, relatively to its sides.

As best seen in Figures 3 and 4, a hinge 28 is connected to the outer side of the intermediate portion 27 of the front bumper portion 13, and is provided with hinge leaves or plates 29 which are adapted to be normally disposed against the parts 26 of the bumper portion 13. The parts 26 are provided with openings 30 to receive brackets 31 which are fastened to and project from the inner sides of the hinge leaves 29. A brace 32 is hingedly connected at one end thereof, at 33, to the free end of each of the brackets 31, and said braces 32 are adapted to be normally disposed along the inner sides of the portions 26, and to be releasably held in folded positions by engagement with spring clips 34, which are fastened to the inner sides of the portions 26 of the front bumper portion 13, as best seen in Figure 7. The brackets 31 loosely engage the openings 30 and the braces 32, as best seen in Figure 5, are adapted to slidably engage in the openings 30, so that the pair of hinge leaves 29 can be swung outwardly to extended positions, relatively to one another, as seen in dotted lines in Figure 4. Referring to Figure 5, each of the braces 32 is provided with a notch 35 in its bottom edge. The portions 26 of the bumper part 13 are each provided with a housing 36 below the opening 30 thereof, and on its inner side. A plunger 37 is slidably mounted in each housing 36 and projects outwardly through the top thereof and is urged upwardly by an expansion spring 38, disposed within the housing 36. When the hinge leaves 29 are in the positions, as seen in dotted lines in Figure 4, the notches 35 are disposed to be engaged by the latch plungers 37 for latching the braces 32 in extended positions for holding the hinge leaves 29 extended.

Obviously, the back bumper portion 14 could be provided with hinge leaves, and the other parts associated therewith, if desired, in the same manner as the front bumper portion 13.

From the foregoing it will be obvious that the bumper side portions 15 will protect the sides of the vehicle 10 and will afford protection particularly to the running boards and fenders from dents and scratches received from collisions with other cars in entering and leaving parking spaces, as well as from similar damage resulting from striking the sides of garages and other enclosures. The bumper side portions 15 being disposed at substantially the normal bumper level will also receive the impact of the bumper of another car striking the side of the vehicle 10. The shape of the front and back bumper portions 13 and 14 is such that should two vehicles 10, equipped with the bumpers 12, collide so that end portions of the bumpers contact one another, the colliding surfaces 26 of the two bumpers 12 will cause the force of the impact to be deflected and will cause the two vehicles 10 to be deflected away from one another so that neither vehicle will be seriously damaged and so that neither vehicle will receive the full impact of the collision.

Should it be necessary to push a car 10 equipped with a bumper 12 with another similarly equipped car 10, the hinge leaves 29 of the front bumper 13, of the vehicle 10 which is to do the pushing, are extended to their dotted line positions of Figure 4, so that they will afford a flat surface to engage the intermediate portion 27 of the back bumper 14 of the other vehicle to prevent the bumper portions from being deflected away from one another, as would otherwise obviously occur. If the portions 13 and 14 are both equipped with the pushing attachment, shown in Figure 4, the rear bumper portion 14 of the vehicle to be pushed could also be arranged, as shown in dotted lines in Figure 4, so that two substantially flat surfaces would be afforded and which would be arranged to abut against one another.

Various modifications and changes are contemplated and may obvioulsy be resorted to as only a preferred embodiment of the invention has been disclosed.

I claim as my invention:

1. A bumper for the front or back of a motor vehicle having outwardly inclined complementary end portions converging at substantially the longitudinal center of a motor vehicle, on which the bumper is adapted to be mounted, to form an outwardly bowed rounded intermediate portion, comprising a pair of hinge leaves hingedly connected to the outer side of the center of said bumper and normally engaging against the outer sides of the ends thereof, brackets projecting from the inner sides of said leaves, braces hingedly connected to the brackets, said bumper being provided with openings through which said braces loosely extend, means for latching the braces against the inner side of the bumper for holding the hinge leaves against the outer side thereof, and latch means for holding said braces in extended positions relatively to the bumper for holding the hinge leaves in extended positions relatively to one another and out of engagement with the bumper.

2. A bumper for automobiles adapted to extend entirely around an automobile, said bumper having tapered end portions forming the bumpers for the back and front of the vehicle, plates, hingedly connected together, attached to the intermediate parts of said tapered end portions and normally disposed thereagainst, latch means for holding said plates against said end portions, braces hingedly connected to the plates for holding the plates of each of the end portions in extended positions relatively to one another and out of engagement with the end portions of the automobile bumper, and latch means carried by the end portions of the automobile bumper for engaging said braces for releasably holding the braces in extended positions.

DALE H. HEXTELL.